US011033968B2

(12) United States Patent
Sutcliffe

(10) Patent No.: US 11,033,968 B2
(45) Date of Patent: Jun. 15, 2021

(54) ADDITIVE MANUFACTURING APPARATUS AND A FLOW DEVICE FOR USE WITH SUCH APPARATUS

(71) Applicant: RENISHAW PLC, Wotton-under-Edge (GB)

(72) Inventor: Christopher John Sutcliffe, Liverpool (GB)

(73) Assignee: RENISHAW PLC, Wotton-under-Edge (GB)

( * ) Notice: Subject to any disclaimer, the term of this patent is extended or adjusted under 35 U.S.C. 154(b) by 224 days.

(21) Appl. No.: 15/738,385

(22) PCT Filed: Jul. 25, 2016

(86) PCT No.: PCT/GB2016/052266
§ 371 (c)(1),
(2) Date: Dec. 20, 2017

(87) PCT Pub. No.: WO2017/013454
PCT Pub. Date: Jan. 26, 2017

(65) Prior Publication Data
US 2018/0333779 A1    Nov. 22, 2018

(30) Foreign Application Priority Data

Jul. 23, 2015    (GB) ..................................... 1513006
Jan. 22, 2016    (GB) ..................................... 1601193

(51) Int. Cl.
*B22F 3/105*        (2006.01)
*B33Y 30/00*        (2015.01)
(Continued)

(52) U.S. Cl.
CPC ............ *B22F 12/00* (2021.01); *B29C 64/153* (2017.08); *B29C 64/35* (2017.08); *B29C 64/364* (2017.08);
(Continued)

(58) Field of Classification Search
CPC ............ B22F 3/1055; B22F 2003/1056; B22F 2003/1059; B29C 64/153; B29C 64/35;
(Continued)

(56) References Cited

U.S. PATENT DOCUMENTS

| 5,342,455 A | 8/1994 | Bonner et al. |
| 5,876,767 A | 3/1999 | Mattes et al. |

(Continued)

FOREIGN PATENT DOCUMENTS

| CN | 102528034 A | 7/2012 |
| CN | 202411419 U | 9/2012 |

(Continued)

OTHER PUBLICATIONS

Jan. 17, 2017 Search Report issued in International Patent Application No. PCT/GB2016/052266.

(Continued)

*Primary Examiner* — Robert J Grun
(74) *Attorney, Agent, or Firm* — Oliff PLC

(57) ABSTRACT

This invention concerns a flow device for an additive manufacturing apparatus, in which material is consolidated in a layer-by-layer manner to build a part. The flow device comprises a first member having at least one inlet aperture therein and a second member having three or more downstream apertures therein. The first and second members are connected such that the downstream apertures of the second member are in fluid communication with the inlet aperture of the first member with a shortest fluid path from the inlet aperture to each downstream aperture being substantially the same.

21 Claims, 4 Drawing Sheets

(51) Int. Cl.
*B22F 12/00* (2021.01)
*B29C 64/35* (2017.01)
*B29C 64/153* (2017.01)
*B29C 64/364* (2017.01)
*B22F 10/10* (2021.01)

(52) U.S. Cl.
CPC ............... *B33Y 30/00* (2014.12); *B22F 10/10* (2021.01); *Y02P 10/25* (2015.11)

(58) Field of Classification Search
CPC ....... B29C 64/20; B29C 64/364; B33Y 30/00; Y02P 10/295
See application file for complete search history.

(56) References Cited

U.S. PATENT DOCUMENTS

| | | |
|---|---|---|
| 5,983,566 A | 11/1999 | Endertein et al. |
| 6,215,093 B1 | 4/2001 | Meiners et al. |
| 6,583,379 B1 * | 6/2003 | Meiners ............... B23K 26/123 219/121.6 |
| 9,669,583 B2 | 6/2017 | Ferrar |
| 10,335,854 B2 | 7/2019 | Wiesner et al. |
| 2009/0255912 A1 | 10/2009 | Dietrich |
| 2009/0266803 A1 | 10/2009 | Perret et al. |
| 2011/0135840 A1 | 6/2011 | Doye et al. |
| 2014/0287080 A1 | 9/2014 | Scott et al. |
| 2015/0367574 A1 | 12/2015 | Araie et al. |

FOREIGN PATENT DOCUMENTS

| | | |
|---|---|---|
| CN | 203637192 U | 6/2014 |
| DE | 102004031881 A1 | 1/2006 |
| DE | 102010026139 A1 | 1/2012 |
| DE | 102014000022 A1 | 7/2015 |
| EP | 1825948 A2 | 8/2007 |
| EP | 1839781 A2 | 10/2007 |
| EP | 2774703 A1 | 9/2014 |
| JP | 2012-224919 A | 11/2012 |
| JP | 2014-201068 A | 10/2014 |
| JP | 5721887 B1 | 5/2015 |
| JP | 2016-516886 A | 6/2016 |

OTHER PUBLICATIONS

Jun. 16, 2016 Search Report issued in British Patent Application No. GB1513006.5.
Sep. 30, 2015 Partial Search Report issued in British Patent Application No. GB1513006.5.
Jan. 17, 2017 Written Opinion issued in International Patent Application No. PCT/GB2016/052266.

* cited by examiner

ADDITIVE MANUFACTURING APPARATUS AND A FLOW DEVICE FOR USE WITH SUCH APPARATUS

FIELD OF INVENTION

This invention concerns additive manufacturing apparatus and a flow device for use in such apparatus. The invention has particular, but not exclusive application, to apparatus for selective laser melting (SLM) and selective laser sintering (SLS).

BACKGROUND

Additive manufacturing or rapid prototyping methods for producing components comprise layer-by-layer consolidation of a material, such as a powder material, using a focussed laser beam or an electron beam. In SLM or SLS, a powder layer is deposited in a build chamber and a focussed laser beam is scanned across portions of a powder layer that correspond to a cross-section of the component being constructed such that the powder at the points where the laser scans is consolidated either by sintering or fusion. After consolidation of a layer, a build surface is lowered by a thickness of the newly consolidated layer and a further layer of powder is spread over the surface and consolidated as required. Typically, the laser beam will enter into the chamber through a window in the chamber.

During SLM/SLS of material, in particular metals, a significant amount of condensate can be produced in the build chamber. This condensate should be removed from the build chamber to prevent undesirable effects, such as the condensate settling on and being integrated into the component being built and/or the condensate blocking the window through which the laser beam enters into the chamber. It is known to remove condensate from the build chamber by introducing a gas flow through the chamber in which the condensate is entrained, the condensate exiting the chamber along with the gas flow through an exhaust.

U.S. Pat. No. 6,215,093 discloses directing a protective gas stream to the melting point via a nozzle. The nozzle travels together with the laser beam.

DE102004031881 A1 discloses providing an annular device having a plurality of suction apertures. Nozzles are provided to provide a gas flow to the interior of the annular device.

U.S. Pat. No. 6,583,379 discloses a first inlet and outlet apertures for providing a protective gas stream across a bottom of a process chamber and second inlet apertures adjacent a beam injection window to protect the beam injection window from being soiled by gaseous components rising from a zone interaction.

U.S. Pat. No. 5,876,767 discloses a ring nozzle arranged adjacent to the image-side surface of the lens facing a working plane. The ring nozzle having its outlet oriented relative to the image-side surface so that a discharged stream strokes tangentially along the image-side surface towards the centre. The gas flows radially towards the centre of the lens and therefrom in direction towards the working plane.

US2009/0266803 A1 discloses a device for providing gas flow across a coupling window through which a laser enters a processing chamber. A first gap supplies a first gas that substantially strokes tangentially over the surface of a coupling window. A second gap is provided in a wall section, which has a shape of a hollow cylinder section so that gas escaping from the second gap at first flows into the groove that is formed by the section and obtains a downward momentum towards the working plane. After passing an edge of the hollow cylinder section, the gas flows with a distance to the surface of the coupling window substantially in parallel alongside the surface. The device allegedly generates two substantially laminar flows across the window that marginally mix.

It has been found that arrangements that generate gas flows parallel to a window can entrain condensate carrying gas into the flow bringing the condensate in close proximity to the window. Furthermore, it is desirable to provide a gas nozzle that provides an equal gas velocity across its width in order to achieve uniform gas flow through the build chamber.

SUMMARY OF INVENTION

According to a first aspect of the invention there is provided an additive manufacturing apparatus, in which material is consolidated in a layer-by-layer manner to build a part, the additive manufacturing apparatus comprising a build chamber having a window, a radiation source for generating an energy beam deliverable through the window for consolidating material in a working plane, a lower gas nozzle and an exhaust arranged for generating a gas knife across the working plane and an upper gas nozzle located above the lower gas nozzle, the upper gas nozzle oriented such that a jet of gas expelled therefrom is directed downwards away from an internal surface of the window such that condensate can be entrained in the jet and carried to the exhaust.

In this way, condensate produced by the consolidation process that is not captured by the gas knife is prevented from settling on the internal surface of the window by the jet of gas (the stream of gas formed directly from the pressurised gas forced out of an aperture in the upper gas nozzle). It has been found that directing a jet of gas from a location adjacent to the window away from the internal surface of the window reduces a quantity of condensate that settles on the window compared to directing the jet of gas parallel with the internal surface.

The upper gas flow nozzle may be oriented for generating a jet of gas in the build chamber directed towards the exhaust. For example, the jet of gas may be directed at an acute angle to the working plane. Alternatively, the upper or a further upper gas flow nozzle may be oriented for generating a jet of gas in the build chamber at a normal to the working plane. By directing the jet of gas downwards towards the exhaust and away from the internal surface of the window, condensate entrained in the jet is carried away from the internal surface to an extraction point rather than along a path that includes traversal of the internal surface of the window.

The or each upper gas nozzle may comprise one or more apertures for generating the jet of gas. A normal to the or each aperture may extend in a direction downwards towards the exhaust and away from an internal surface of the window. The upper gas nozzle may comprise a passageway leading to the or each aperture, a tangent to a wall of the passageway at the aperture being angled relative to the internal surface of the optical window to generate the jet of gas in the required direction.

The or each upper gas nozzle may be located adjacent to the optical window.

The gas flow nozzle may be located on a side of the window opposite to that of the exhaust. In this way, the jet of gas may block a direct path of condensate from the working plane to the window.

The or each upper gas flow nozzle may comprise one or more apertures for generating a sheet-like jet of gas that extends across a width of the window. Preferably, the or each upper gas flow device comprises a plurality of outlet apertures extending across a width of the build chamber.

The or each upper gas nozzle may comprise a first member having at least one inlet aperture therein and a second member having three or more downstream apertures therein, the downstream apertures in fluid communication with the inlet aperture such that a shortest fluid path from the inlet aperture to each downstream aperture is substantially the same.

Accordingly, in a second aspect there is provided a flow device for an additive manufacturing apparatus, in which material is consolidated in a layer-by-layer manner to build a part, the flow device comprising a first member having at least one inlet aperture therein and a second member having three or more downstream apertures therein, the first and second members connected such that the downstream apertures of the second member are in fluid communication with the inlet aperture of the first member with a shortest fluid path from the inlet aperture to each downstream aperture being substantially the same.

The or each upper gas nozzle/flow device may comprise at least one intermediate member between the first member and the second member, the at least one intermediate member having a plurality of intermediate apertures therein, two or more of the intermediate apertures in fluid communication with the inlet aperture of the first member and each intermediate aperture in fluid communication with two or more of the downstream apertures of the second member.

The upper gas nozzle/flow device may comprise a plurality of intermediate members, two or of more of the intermediate apertures of each intermediate member in fluid communication with the same intermediate aperture of the intermediate member or the inlet aperture of the first member that immediately precedes that intermediate member in the upstream direction.

In one embodiment, the members of the upper gas flow nozzle/flow device comprises a series of concentric cylinders with the apertures spaced along a length of the concentric cylinders. The apertures of each cylinder may be offset about a central axis of the concentric cylinders by 180 degrees from the apertures of adjacent cylinders in the series.

In another embodiment, the members of the upper gas flow nozzle/flow device comprises a plurality of plates with a dividing member sandwiched between each pair of plates, the dividing member providing a passageway for the flow of gas between the apertures in each plate of the pair. The or each dividing member may comprise a plate having one or more slots therein for defining the one or more passageways. The or each slot may comprise a set of connected longitudinal arms, the arms being of equal length and extending in different directions with equal angles between each pair of adjacent arms (as would be the case for a complete set of radii of a regular polygon).

In one embodiment, the or each downstream aperture of the upper gas nozzle/flow device may comprise an aperture in a roof or wall of a build chamber of the additive manufacturing apparatus. In one embodiment, each member of the upper gas nozzle/flow device is fixed together to form a roof or wall of the build chamber.

In another embodiment, the or each upper gas nozzle/flow device may comprise a gas flow device separate from the build chamber and located in the build chamber. In this way, the upper gas nozzle/flow device may be removable from the build chamber for cleaning/replacement and/or repositioning an aperture of the flow device in the build chamber. For example, in one embodiment, an outer member of the upper gas nozzle/flow device that defines the one or more apertures may be rotatable to change an orientation of the aperture, altering a direction of the jet of gas generated by the aperture.

The flow device may comprise a heating and/or cooling device for heating/cooling material of the first, second and/or intermediate members.

According to a third aspect of the invention there is provided an additive manufacturing apparatus, in which material is consolidated in a layer-by-layer manner to build a part, the additive manufacturing apparatus comprising a flow device according to the second aspect of the invention.

According to a fourth aspect of the invention there is provided a method of manufacturing a flow device for an additive manufacturing apparatus, in which material is consolidated in a layer-by-layer manner to build a part, the method comprising forming at least one inlet aperture in a first member and forming three or more downstream apertures in a second member, and connecting the first and second members together such that the downstream apertures of the second member are in fluid communication with the inlet aperture of the first member with a shortest fluid path from the inlet aperture to each downstream aperture being substantially the same.

The first and second members may comprise thin walled members, such as plates or cylinders and the apertures may be formed by removal of material from the thin walled members. The material may be removed by laser cutting.

The method may comprise forming at least one intermediate member, and connecting the first member, second member and the at least one intermediate member together with the at least one intermediate member between the first member and the second member such that two or more of the intermediate apertures are in fluid communication with the inlet aperture of the first member and each intermediate aperture is in fluid communication with two or more of the downstream apertures of the second member.

The method may comprise forming a plurality of intermediate members, and connecting the first member, second member and the plurality of two or of more intermediate apertures together with the plurality of intermediate members between the first member and the second member such that two or more of the intermediate apertures of each intermediate member are in fluid communication with the same intermediate aperture of the intermediate member or the inlet aperture of the first member that immediately precedes that intermediate member in the upstream direction.

According to a fifth aspect of the invention there is provided an additive manufacturing apparatus, in which material is consolidated in a layer-by-layer manner to build a part, the additive manufacturing apparatus comprising a build chamber having a window, a radiation source for generating an energy beam deliverable through the window for consolidating material in a working plane, a lower gas nozzle and an exhaust arranged for generating a gas knife across the working plane and an upper gas nozzle located above the lower gas nozzle, the upper gas nozzle oriented such that a stream of gas expelled therefrom is directed downwards away from an internal surface of the window.

In this way, condensate produced by the consolidation process that is not captured by the gas knife is prevented from settling on the internal surface of the window by the gas stream. It has been found that directing a stream of gas from a location adjacent to the window away from the internal surface of the window reduces a quantity of condensate that settles on the window compared to directing the stream of gas parallel with the internal surface.

The upper gas flow nozzle may be oriented for generating a stream of gas in the build chamber directed towards the exhaust. For example, the stream of gas may be directed at an acute angle to the working plane. Alternatively, the upper or a further upper gas flow nozzle may be oriented for generating a stream of gas in the build chamber at a normal to the working plane. By directing the stream of gas downwards towards the exhaust and away from the internal surface of the window, condensate entrained in the stream is carried away from the internal surface to an extraction point rather than along a path that includes traversal of the internal surface of the window.

The or each upper gas nozzle may comprise one or more apertures for generating the stream of gas. A normal to the or each aperture may extend in a direction downwards towards the exhaust and away from an internal surface of the window. The upper gas nozzle may comprise a passageway leading to the or each aperture, a tangent to a wall of the passageway at the aperture being angled relative to the internal surface of the optical window to generate the stream of gas in the required direction.

The or each upper gas nozzle may be located adjacent to the optical window.

The gas flow nozzle may be located on a side of the window opposite to that of the exhaust. In this way, the stream of gas may block a direct path of condensate from the working plane to the window.

The or each upper gas flow nozzle may comprise one or more apertures for generating a sheet-like stream of gas that extends across a width of the window. Preferably, the or each upper gas flow device comprises a plurality of outlet apertures extending across a width of the build chamber.

The or each upper gas nozzle may comprise a first member having at least one inlet aperture therein and a second member having three or more downstream apertures therein, the downstream apertures in fluid communication with the inlet aperture such that a shortest fluid path from the inlet aperture to each downstream aperture is substantially the same.

DESCRIPTION OF EMBODIMENTS

Figure 1:
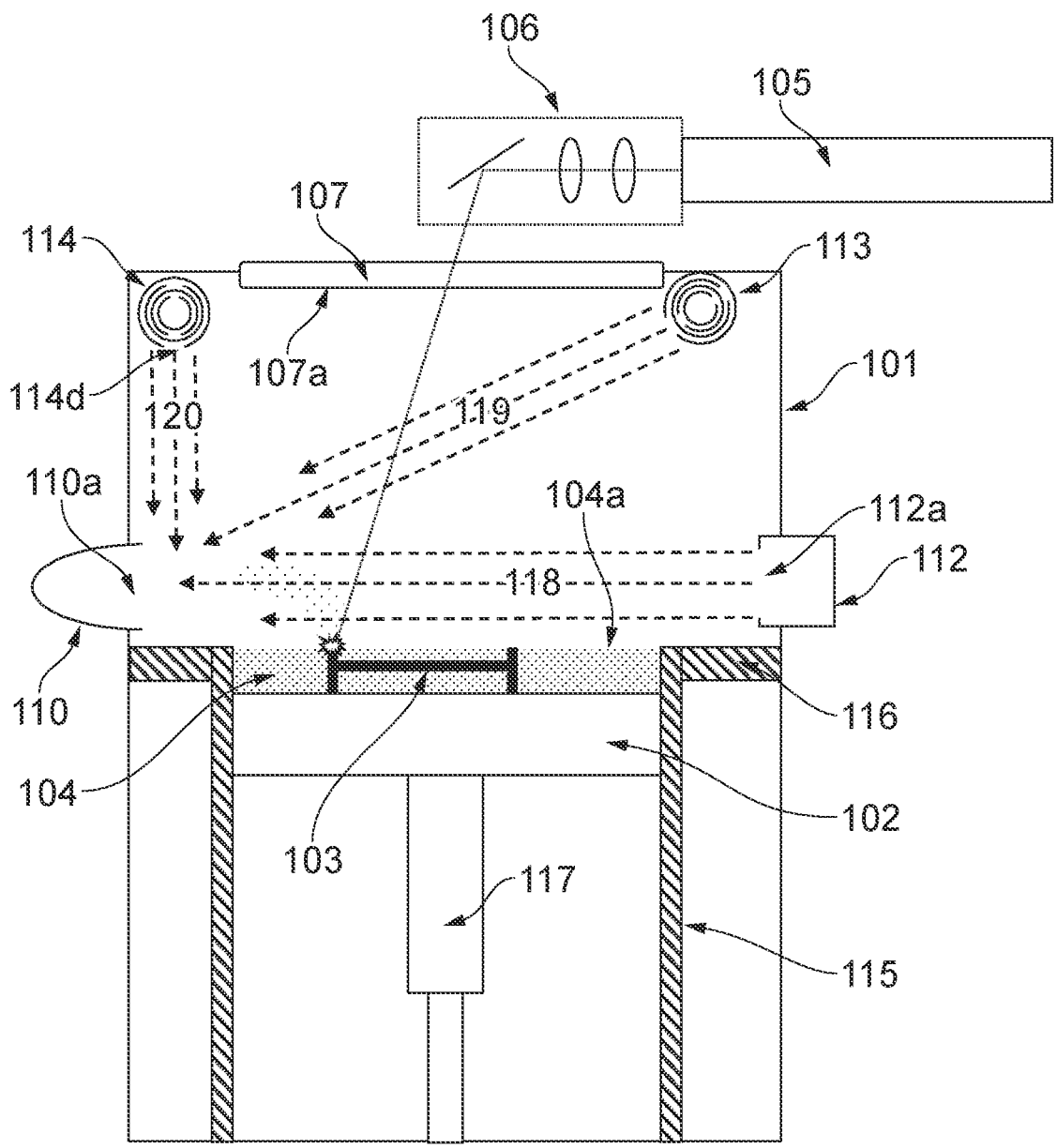
FIG. 1 is a schematic representation of an additive manufacturing apparatus according to the first aspect of the invention.
Figure 2:
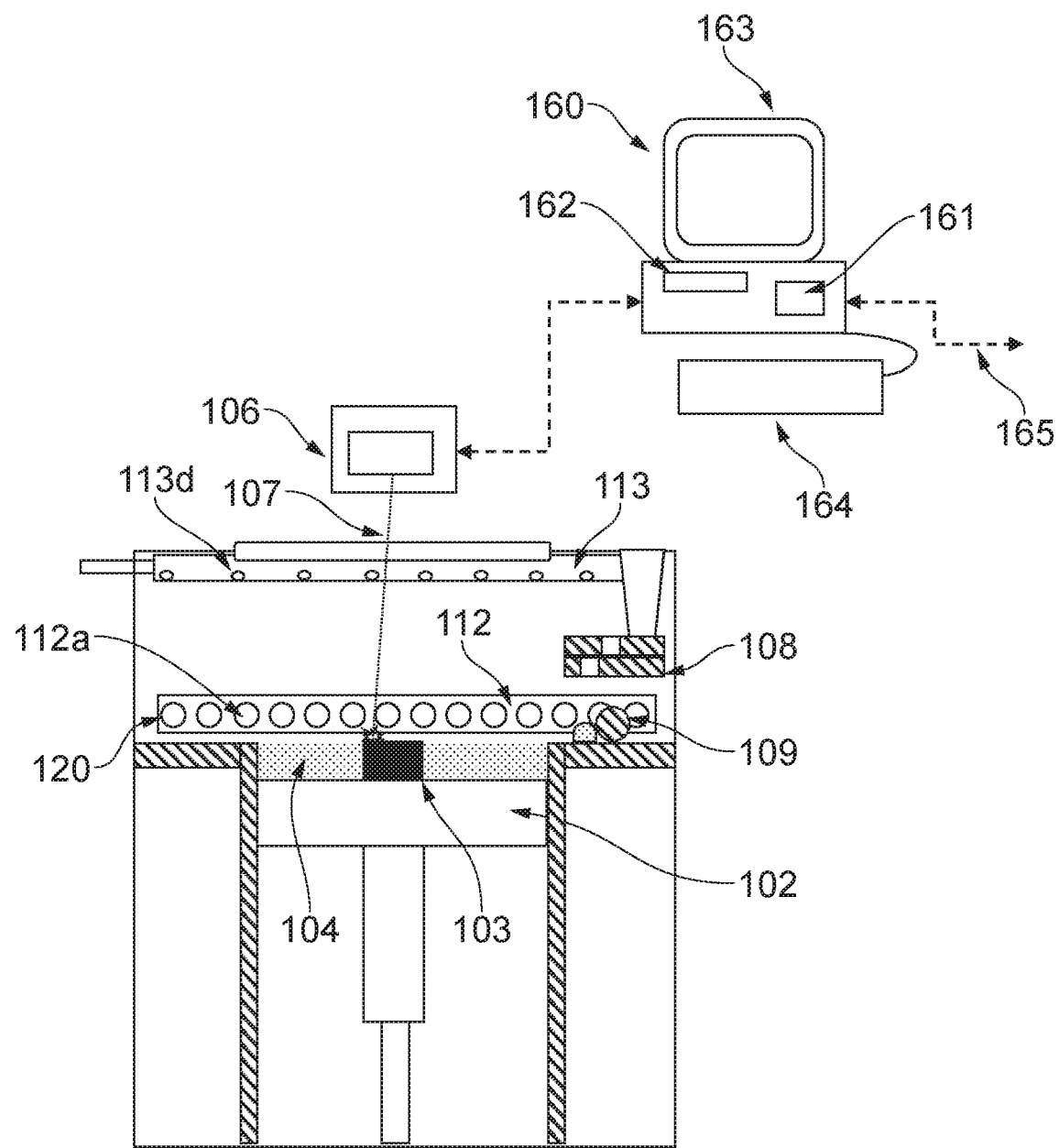
FIG. 2 is a schematic view of the additive manufacturing apparatus shown in FIG. 1 from another side.

Referring to FIGS. 1 and 2, an additive manufacturing apparatus according to an embodiment of the invention comprises a build chamber 101 having therein partitions 115, 116 that define a build volume and a surface onto which powder can be deposited. A build platform 102 defines a working area in which an object 103 is built by selective laser melting powder 104. The platform 102 can be lowered within the build volume 116 using a suitable mechanism 117 as successive layers of the object 103 are formed. A build volume available is defined by the extent to which the build platform 102 can be lowered. Layers of powder 104 are formed as the object 103 is built by dispensing apparatus 108 and a wiper 109. For example, the dispensing apparatus 108 may be apparatus as described in WO2010/007396. A laser module 105 generates a laser for melting the powder 104, the laser directed onto the powder bed 104 as required by optical module 106 under the control of a computer 160. The laser enters the chamber 101 via a window 107. The window may be a window having a flat internal surface 107a or a curved internal surface, for example in the case wherein the window comprises a lens, such as an f-theta lens.

A gas flow system for controlling condensate produced during the laser melting process comprises a first gas nozzle 112 comprising a plurality of gas outlets 112a and a gas exhaust 110 comprising a gas inlet 110a. The gas outlets 112a and gas inlet 110a are arranged for generating a horizontal gas flow (a gas knife) across a working surface of the powder bed 104 formed on the build platform 102. The nozzle 112 and exhaust 110 produce a laminar flow having a flow direction from the nozzle 112 to the exhaust 110, as indicated by arrows 118. Gas is re-circulated from the exhaust 110 to the nozzle 112 through a gas recirculation loop (not shown). A pump maintains the desired gas pressure at gas inlet 112 and gas outlet 110. A filter is provided in the recirculation loop to filter condensate that has become entrapped in the flow.

The gas flow system further comprises an upper gas nozzle 113 located in the top corner of the build chamber 101 adjacent the window 106. Outlets 113d from the upper gas nozzle 113 are oriented to generate a gas flow through the build chamber 101 directed downwards away from an internal surface 107a of the window 107 towards the exhaust 110 (as indicated by arrow 119). The gas flow is directed in a direction that is angled relative to the working surface 104a such that the gas flow traverses the space between the powder bed 104 and the window 107. In this way, condensate that rises above the gas knife 118 is entrapped by the flow 119 and is carried to the exhaust 110.

A further upper gas nozzle 114 is located in the opposite top corner of the build chamber 101 above the exhaust 110. Outlets 114d from the further upper gas nozzle 114 are oriented to generate a gas flow directed vertically downwards away from an internal surface 107a of the window 107 towards the exhaust 110 (as indicated by arrow 120). The gas flow 120 is directed along a wall of the build chamber 101 to the exhaust 110 limiting circulation of gas of the gas knife 118 and flow 119 that carries condensate to an upper region of the build chamber 101 adjacent the internal surface 107a of window 107.

Figures 3A, 3B:
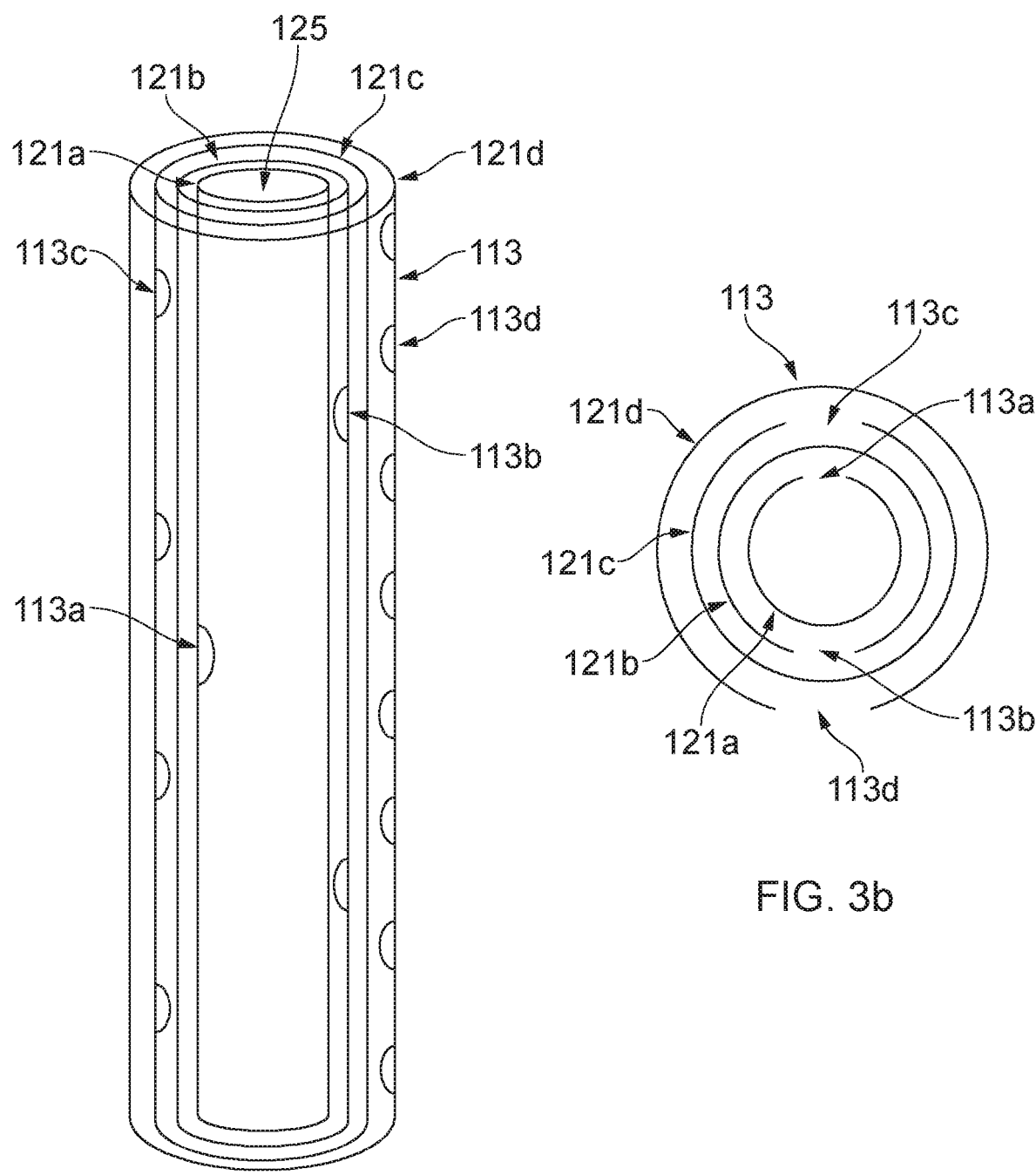
FIG. 3a is a ghost perspective view of a flow device according to one embodiment of the invention.
FIG. 3b is a schematic view of the flow device shown in FIG. 3a illustrating the relative angular positions of the apertures.

Referring to FIGS. 3a and 3b, a flow device is shown used for the upper gas nozzles 113, 114. The flow device comprises a series of, in this embodiment four, concentric tubes 121a to 121d. Tubes 121b to 121d are closed at both ends and tube 121a is closed at one end with the other open end 125 providing an inlet into the flow device for gas. The tubes 121a to 121d comprise corresponding apertures 113a to 113d. FIG. 3b illustrates the relative angular orientation of apertures 113 of the tubes 121a to 121d. It will be understood that FIG. 3b should not be interpreted as showing that the apertures 113a to 113d are located at the same longitudinal location along the flow device but in fact, the locations of the apertures 113a to 113d along a length of the tubes 121 are offset, as shown in FIG. 3a Tube 121a comprises a single (inlet) aperture 113a located centrally along a length of the tube 113a. Tube 121b comprises two intermediate apertures 113b, one located a quarter of the way along tube 113b and the other located three-quarters of the way along the tube 113b. Tube 121c comprises four intermediate apertures 113c located one-eighth, three-eighths, five-eighths and seven-eighths of the way along the length of the tube 121c. Tube 121d comprises eight outlet apertures located one-sixteenth, three-sixteenths, five-sixteenths, seven-sixteenths, nine-sixteenths, eleven-sixteenths, thirteen-sixteenths and fifteen-sixteenths of the way along the length of the tube 121d. It will be understood that in other embodiments, further concentric tubes can be provided with apertures spaced following the pattern of apertures described above. Furthermore, the first tube 121a may be open at both ends to provide two inlets and comprise two equally spaced apertures with a corresponding increase in the number of apertures in the following outer tubes 121b to 121d.

The apertures 113a to 113d in consecutive tubes 121a to 121d are angularly offset by 180 degrees. However, in another embodiment, the apertures 113a to 113d are all oriented in the same direction (with no angular offset).

The labyrinth design of the apertures 113a to 113d, wherein the path length for gas from the aperture 113a to apertures 113d is substantially the same for each aperture 113d, ensures that the gas velocity generated at each aperture 113d is substantially equal. In this way, gas can be introduced into the upper gas nozzles 113, 114 from a side of the chamber 101 (as shown in FIG. 2) whilst still ensuring uniform gas stream 119 across a width of the build chamber 101.

The flow device 113, 114 or an outermost tube 113d of the flow device 113, 114 may be rotatable (manually or under the control of a motor) to adjust a direction of the gas flow from the flow device. In this way, the user can adjust the direction of the gas flow as desired.

Figure 4:
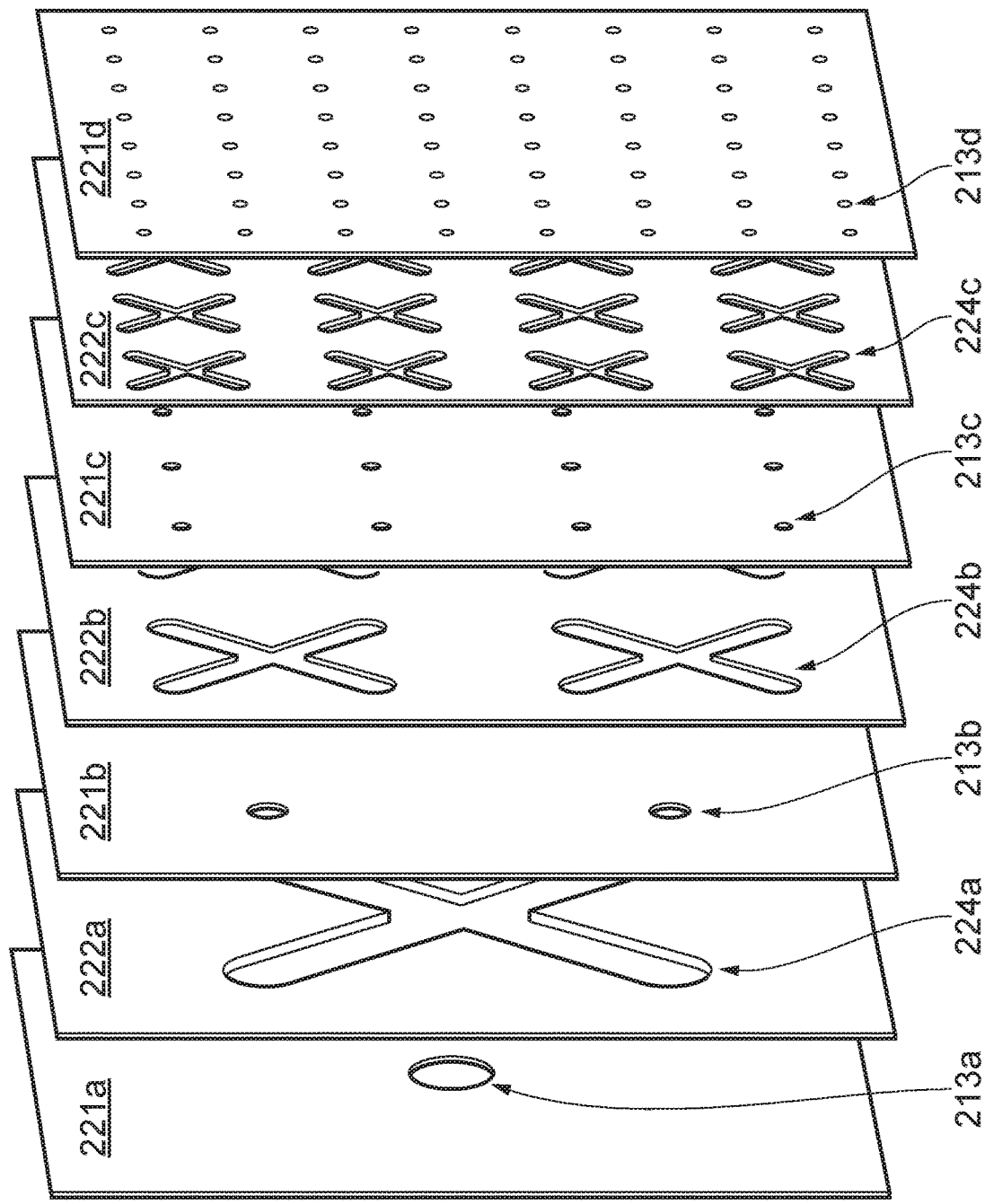
FIG. 4 is an exploded view of a flow device according to another embodiment of the invention.

FIG. 4 shows a further flow device in accordance with the invention that may be used as a roof or wall of the build chamber 101. In this embodiment, rather than the aperture defining members being concentric tubes, the flow device comprises a series of parallel plates 221a to 221d having apertures 213a to 213d therein and a series of dividing plates 222a to 222c having slots 224a at 224c therein. The dividing plates 222a to 222c are sandwiched between plates 221a to 221 such that the slots 224a to 224c form passageways connecting the apertures 213a to 213d in adjacent plates 221a to 221d. The slots 224a to 224c are X-shaped such that one aperture 113a to 113c in an upstream plate 221a to 221c is fluidically connected to four apertures 113b to 113d in a downstream plate 221b to 221d. In this embodiment, the first plate 221a comprises a single inlet aperture 213a, the second plate 221b four equally spaced intermediate apertures 213b, the third plate 221c sixteen equally spaced intermediate apertures 213c and the fourth, final plate 221d sixty-four equally spaced outlet apertures 213d. As with the first embodiment of the flow device described with reference to FIGS. 3a and 3b, the labyrinth design of the apertures 213a to 213d, wherein the path length for gas from the aperture 213a to apertures 213d is substantially the same for each aperture 213d, ensures that the gas velocity generated at each apertures 213d is substantially equal with a minimal pressure drop. In this way, gas can be introduced at a central location into the inlet aperture 213a whilst still ensuring uniform flow across a 2-dimensional area of the build chamber 101.

Suitable adjustments may be made for elements, such as the optical window 107, that may be situated in the roof or wall of the build chamber 101. Furthermore, it may be desirable for only some apertures 113d of the flow device to provide an equal flow velocity. This may be achieved through the appropriate design of slots and apertures in the plates.

Computer 160 comprises a processor unit 161, memory 162, display 163, user input device 164, such as a keyboard, touch screen, etc, a data connection to modules of the laser melting apparatus, such as optical module 106, laser module 105 and motors (not shown) that drive movement of the dispensing apparatus 108, wiper 109 and build platform 102 (and flow device if movable). An external data connection 165 provides for the uploading of scanning instructions to the computer 160. The laser unit 105, optical unit 106, movement of build platform 102 and flow device are controlled by the computer 160 based upon the scanning instructions.

It will be understood that modifications and alteration scan be made to the above described embodiments without departing from the scope of the invention as defined in the claims.

For example, the flow device may comprise a heating device to heat the cylinders/plates to burn-off condensate that becomes trapped within the labyrinth of passageways. Additionally or alternatively, the flow device may comprise a device for cooling the cylinders/plates to facilitate deposition of condensate within the flow device during the build. The condensate may then be burnt off at an appropriate time later, such as between builds or during a period when the powder is not being consolidated by the laser beam, such as during spreading of a powder layer with the wiper.

The invention claimed is:

1. A selective laser melting additive manufacturing apparatus, in which powder layers, successively formed in a working plane, are consolidated in selected areas to build a part in a layer-by-layer manner, the selective laser melting additive manufacturing apparatus comprising:
   a build chamber having a window;
   partitions that define a build volume;
   a build platform for supporting a powder bed formed from the powder layers, the build platform movable in the build volume;
   a radiation source for generating an energy beam deliverable through the window for consolidating material in the working plane;
   a lower gas nozzle and an exhaust arranged for generating a gas knife across the working plane including the powder bed; and
   a plurality of gas inlet apertures in an upper wall of the build chamber defining a 2-dimensional gas inlet area extending from adjacent to the window at least to a region directly above at least one of the partitions, wherein a normal to each gas inlet aperture extends in a direction downwards away from an internal surface of the window such that gas expelled from the gas inlet apertures is directed downwards away from an internal surface of the window.

2. The selective laser melting additive manufacturing apparatus according to claim 1, wherein the upper wall of the build chamber is a roof of the build chamber.

3. The selective laser melting additive manufacturing apparatus according to claim 1, wherein the plurality of apertures comprises a 2-dimensional array of apertures.

4. The selective laser melting additive manufacturing apparatus according to claim 1, wherein the plurality of gas inlet apertures is arranged to ensure uniform flow across a 2-dimensional area within the build chamber.

5. The selective laser melting additive manufacturing apparatus according to claim 1, wherein the plurality of gas inlet apertures extends across a width of the build chamber.

6. The selective laser melting additive manufacturing apparatus according to claim 1, wherein the plurality of gas inlet apertures is arranged to generate a stream of gas in the build chamber at a normal to the working plane.

7. A selective laser melting additive manufacturing apparatus according to claim 1, wherein the plurality of inlet gas apertures is arranged such that a gas flow velocity through different ones of the apertures is unequal.

8. A selective laser melting additive manufacturing apparatus according to claim 1, wherein the plurality of apertures is at least provided on an opposite side of the window to the exhaust.

9. A selective laser melting additive manufacturing apparatus according to claim 1, wherein the plurality of apertures is arranged to provide a stream of gas directed at an acute angle to the working plane.

10. A selective laser melting additive manufacturing apparatus according to claim 1, wherein the upper wall of the build chamber is formed from a sheet into which the plurality of apertures is cut.

11. A selective laser melting additive manufacturing apparatus, in which powder layers, successively formed in a working area, are consolidated in selected areas to build a part in a layer-by-layer manner, the selective laser melting the additive manufacturing comprising:
a build chamber having a window;
partitions that define a build volume;
a build platform for supporting a powder bed formed from the powder layers, the build platform movable in the build volume;
a radiation source for generating an energy beam deliverable through the window for consolidating material in the working plane;
a lower gas nozzle and an exhaust arranged for generating a gas knife across the working plane including the powder bed; and
a plurality of gas inlet apertures located in a roof of the build chamber and above the lower gas nozzle, the plurality apertures defining a 2-dimensional gas inlet area extending from adjacent to the window at least to a region directly above at least one of the partitions, wherein a normal to each aperture extends in a direction downwards away from an internal surface of the window.

12. The selective laser melting additive manufacturing apparatus according to claim 11, wherein the plurality of gas inlet apertures comprises a 2-dimensional array of apertures.

13. The selective laser melting additive manufacturing apparatus according to claim 11, wherein the plurality of gas inlet apertures is arranged to ensure uniform flow across a 2-dimensional area within the build chamber.

14. The selective laser melting additive manufacturing apparatus according to claim 11, wherein the plurality of gas inlet apertures is located adjacent to the window.

15. The selective laser melting additive manufacturing apparatus according to claim 11, wherein the plurality of gas inlet apertures extends across a width of the build chamber.

16. The selective laser melting additive manufacturing apparatus according to claim 11, wherein the plurality of gas inlet apertures is oriented to generate a stream of gas in the build chamber at a normal to the working plane.

17. A selective laser melting additive manufacturing apparatus according to claim 11, wherein the roof of the build chamber is formed from a sheet into which the plurality of apertures is cut.

18. A selective laser melting additive manufacturing apparatus, in which successively formed powder layers are consolidated in selected areas to build a part in a layer-by-layer manner, the selective laser melting additive manufacturing apparatus comprising:
a build chamber having a roof and a widow;
partitions that define a build volume;
a build platform for supporting a powder bed formed from the powder layers, the build platform movable in the build volume;
a radiation source for generating an energy beam deliverable through the window for consolidating material in a working plane,
a lower gas nozzle and an exhaust arranged for generating a gas knife across the working plane including the powder bed; and
a plurality of gas inlet apertures in the roof of the build chamber, the plurality of gas apertures distributed adjacent the window to define a planar gas inlet area arranged substantially parallel to the working plane, the planar gas inlet area extending from adjacent to the window at least to a region directly above at least one of the partitions.

19. The selective laser melting additive manufacturing apparatus according to claim 18, wherein a normal to each gas inlet aperture extends in a direction downwards away from an internal surface of the window.

20. A selective laser melting additive manufacturing apparatus according to claim 18, wherein the roof of the build chamber is formed from a sheet into which the plurality of apertures is cut.

21. A selective laser melting additive manufacturing apparatus according to claim 18, wherein the plurality of gas inlet apertures comprises 2-dimensional array of apertures.

* * * * *